US012621785B2

(12) United States Patent
Kou et al.

(10) Patent No.: US 12,621,785 B2
(45) Date of Patent: May 5, 2026

(54) TIME SYNCHRONIZATION TECHNIQUES

(71) Applicant: ZTE Corporation, Shenzhen (CN)

(72) Inventors: Shuaihua Kou, Shenzhen (CN); Peng Hao, Shenzhen (CN); Wei Gou, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 118 days.

(21) Appl. No.: 18/534,435

(22) Filed: Dec. 8, 2023

(65) Prior Publication Data

US 2024/0107478 A1 Mar. 28, 2024

Related U.S. Application Data

(63) Continuation of application No. PCT/CN2021/110701, filed on Aug. 5, 2021.

(51) Int. Cl.
H04W 56/00 (2009.01)
H04L 5/00 (2006.01)
(52) U.S. Cl.
CPC ....... H04W 56/0045 (2013.01); H04L 5/0048 (2013.01)
(58) Field of Classification Search
None
See application file for complete search history.

(56) References Cited

U.S. PATENT DOCUMENTS

| | | | |
|---|---|---|---|
| 10,244,499 B2 | 3/2019 | Rune et al. | |
| 2011/0292819 A1 | 12/2011 | Ekbal et al. | |

| | | | |
|---|---|---|---|
| 2012/0178482 A1 | 7/2012 | Seo et al. | |
| 2018/0242268 A1 | 8/2018 | Rune et al. | |
| 2019/0190635 A1 | 6/2019 | Goel et al. | |
| 2020/0100201 A1 | 3/2020 | Farmanbar et al. | |
| 2020/0120627 A1 | 4/2020 | Xie et al. | |

(Continued)

FOREIGN PATENT DOCUMENTS

| | | |
|---|---|---|
| CN | 109151983 A | 1/2019 |
| CN | 109891957 A | 6/2019 |

(Continued)

OTHER PUBLICATIONS

International Search Report and Written Opinion for International Application No. PCT/CN2021/110701, mailed on Mar. 28, 2022 (6 pages).

(Continued)

*Primary Examiner* — Maharishi V Khirodhar
(74) *Attorney, Agent, or Firm* — Perkins Coie

(57) ABSTRACT

Techniques are described to determine a time clock value by a communication device using information provided by a network device. An example wireless communication method includes receiving, by a communication device, a first signal in a first time period; transmitting, by the communication device, a second signal in a second time period later than the first time period to a network device; receiving, by the communication device, a third message comprising a timing information associated with the first time period, the second time period, or a propagation delay value; and determining, by the communication device, a time when the communication device receives the first signal based at least on the timing information.

12 Claims, 8 Drawing Sheets

(56) References Cited

U.S. PATENT DOCUMENTS

| | | | |
|---|---|---|---|
| 2020/0128539 A1* | 4/2020 | Abedini ............ | H04W 56/0045 |
| 2020/0229124 A1* | 7/2020 | Soriaga ................ | H04W 64/00 |
| 2021/0153193 A1 | 5/2021 | Lin | |
| 2021/0185653 A1 | 6/2021 | Uchino et al. | |
| 2021/0218489 A1 | 7/2021 | Xu et al. | |
| 2021/0219254 A1 | 7/2021 | Wang et al. | |
| 2023/0370994 A1* | 11/2023 | Yang .................... | H04L 5/0094 |
| 2024/0121736 A1* | 4/2024 | Min ...................... | H04W 24/10 |

FOREIGN PATENT DOCUMENTS

| | | | |
|---|---|---|---|
| CN | 111867041 | A | 10/2020 |
| CN | 112640543 | A | 4/2021 |
| JP | 2017-522791 | A | 8/2017 |
| WO | 2015006426 | A | 1/2015 |
| WO | 2019/087319 | A1 | 5/2019 |
| WO | 2021/050216 | A1 | 3/2021 |
| WO | 2021/090463 | A1 | 5/2021 |

OTHER PUBLICATIONS

JPO, Notice of Allowance for Japanese Application No. 2023-575558, mailed on Apr. 1, 2025, 3 pages with unofficial English translation.

JPO, Office Action for Japanese Application No. 2023-575558, mailed on Dec. 12, 2024, 7 pages with unofficial English translation.

EPO, Extended European Search Report for European Application No. 21 952 271.1, mailed on Feb. 10, 2025, 9 pages.

* cited by examiner

500

Memory 505

Processor(s) 510

Transmitter 515

Receiver 520

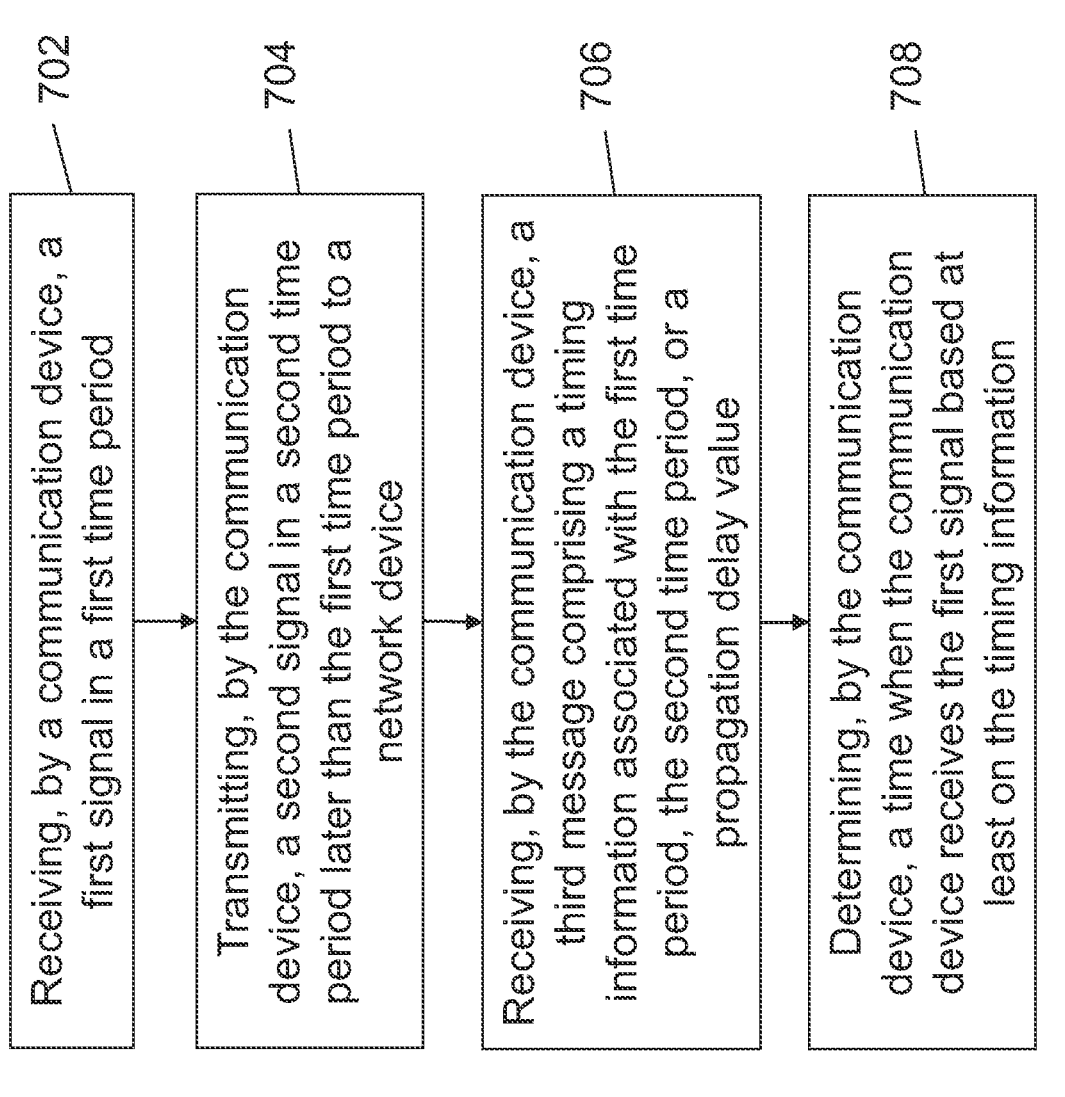

702 Receiving, by a communication device, a first signal in a first time period

704 Transmitting, by the communication device, a second signal in a second time period later than the first time period to a network device 706 Receiving, by the communication device, a third message comprising a timing information associated with the first time period, the second time period, or a propagation delay value 708 Determining, by the communication device, a time when the communication device receives the first signal based at least on the timing information

FIG. 7

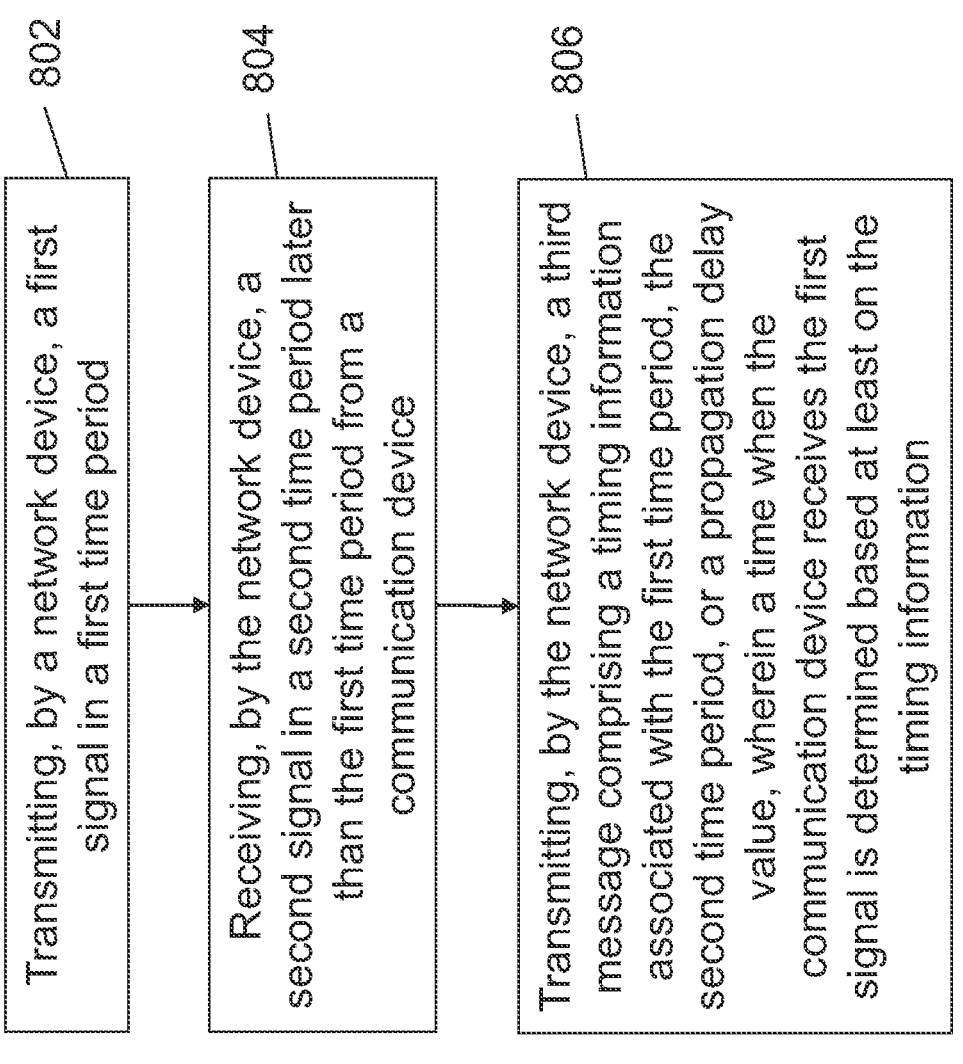

802

Transmitting, by a network device, a first signal in a first time period

804

Receiving, by the network device, a second signal in a second time period later than the first time period from a communication device

806

Transmitting, by the network device, a third message comprising a timing information associated with the first time period, the second time period, or a propagation delay value, wherein a time when the communication device receives the first signal is determined based at least on the timing information

FIG. 8

TIME SYNCHRONIZATION TECHNIQUES

CROSS-REFERENCE TO RELATED APPLICATIONS

This application is a continuation of International Patent Application No. PCT/CN2021/110701, filed on Aug. 5, 2021, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for determining a time clock value by a communication device, such as a user equipment (UE), using information provided by a network device, such as a base station (BS).

A first wireless communication method includes receiving, by a communication device, a first signal in a first time period; transmitting, by the communication device, a second signal in a second time period later than the first time period to a network device; and receiving, by the communication device, a third message comprising a timing information associated with the first time period, the second time period, or a propagation delay value. Operation 708 includes determining, by the communication device, a time when the communication device receives the first signal based at least on the timing information.

In some embodiments, the timing information in the third message includes a transmission time of the first time period within which the first signal is transmitted by the network device, the third message includes a timing advance (TA) value, the communication device determines an updated TA value by using the TA value and a previous TA value or by using the TA value, and the communication device determines the time when the communication device receives the first signal by adding the transmission time of the first time period to one half of the updated TA value. In some embodiments, the timing information in the third message includes a transmission time of the first time period within which the first signal is transmitted by the network device, and the communication device determines the time when the communication device receives the first signal by adding the transmission time of the first time period to the propagation delay value. In some embodiments, the timing information in the third message includes: a transmission time of the first time period within which the first signal is transmitted by the network device, and a first time difference value that is a function of at least a difference between the transmission time of the first time period and a reception time of the second time period within which the second signal is received by the network device, the communication device determines the time when the communication device receives the first signal by adding the transmission time of the first time period to the propagation delay value, and the propagation delay value is determined by the first time difference value and a second time difference value that is a function of at least a difference between a reception time of the first time period and a transmission time of the second time period.

In some embodiments, the first time difference value is a function of: (1) the difference between the transmission time of the first time period and the reception time of the second time period, and (2) a time offset that indicates a time difference between the first time period and the second time period, and the second time difference value is a function of: (1) the difference between the reception time of the first time period and the transmission time of the second time period, and (2) the time offset that indicates the time difference between the first time period and the second time period. In some embodiments, the timing information in the third message includes: a transmission time of the first time period within which the first signal is transmitted by the network device, and a reception time of the second time period within which the second signal is received by the network device, and the communication device determines the time when the communication device receives the first signal by subtracting or adding a time clock offset value from or to a first time associated with a first boundary of the first time period in which the first signal is received by the communication device, and the time clock offset value is a function of: the transmission time of the first time period, the reception time of the second time period, the first time associated with the first boundary of the first time period, and a second time associated with a second boundary of the second time period in which the second signal is transmitted by the communication device.

In some embodiments, the timing information in the third message includes a first sum of: (1) a transmission time of the first time period within which the first signal is transmitted by the network device, and (2) a reception time of the second time period within which the second signal is received by the network device, and the communication device determines the time when the communication device receives the first signal by subtracting or adding a value determined by the communication device from or to a first time associated with a first boundary of the first time period in which the first signal is received by the communication device, the value is a function of a first variable and a second variable, the first variable is the first sum, and the second variable is a second sum of: (1) the first time associated with the first boundary of the first time period and (2) a second time associated with a second boundary of the second time period in which the second signal is transmitted by the communication device.

In some embodiments, the method further comprises receiving, by the communication device prior to the receiving the first signal, a second message that: identifies any one or more of the first time period or the second time period, or indicates a transmission time of the first time period within which the first signal is transmitted by the network device.

In some embodiment, the method further comprises transmitting, by the communication device, a first message that indicates to the network device to transmit the second message, wherein the communication device receives the second message in response to the transmitting the first message. In some embodiments, the first message is included in a resource control (RRC) signaling, a medium access control (MAC) control element (CE), or an uplink control information (UCI). In some embodiments, the transmission time is associated with a starting boundary of the first time period or an ending boundary of the first time period, or the reception time is associated with a starting boundary of the second time period or an ending boundary of the second time period. In some embodiments, the first time period or the second time period include a system frame, a sub-frame, a slot, a sub-slot, or an orthogonal frequency division multiplexing (OFDM) symbol. In some embodiments, the second message or the third message is included in a resource control (RRC) signaling, a medium access control (MAC) control element (CE), or downlink control information (DCI).

In some embodiments, the first signal includes a downlink (DL) reference signal (RS) or a downlink channel. In some embodiments, the DL RS include a synchronization signal block (SSB) comprising a synchronization signal (SS) and a physical broadcast channel (PBCH) block, a channel state information reference signal (CSI-RS), a tracking reference signal (TRS), or a positioning reference signal (PRS). In some embodiments, the downlink channel includes a physical downlink control channel (PDCCH) or a physical downlink shared channel (PDSCH). In some embodiments, the second signal includes a physical random access channel (PRACH), a sounding reference signal (SRS), a physical uplink shared channel (PUSCH), or a physical uplink control channel (PUCCH).

A second wireless communication method includes transmitting, by a network device, a first signal in a first time period; receiving, by the network device, a second signal in a second time period later than the first time period from a communication device; and transmitting, by the network device, a third message comprising a timing information associated with the first time period, the second time period, or a propagation delay value, wherein a time when the communication device receives the first signal is determined based at least on the timing information.

In some embodiments, the timing information in the third message includes a transmission time of the first time period within which the first signal is transmitted by the network device, and the third message includes a timing advance (TA) value. In some embodiments, the timing information in the third message includes a transmission time of the first time period within which the first signal is transmitted by the network device. In some embodiments, the timing information in the third message includes: a transmission time of the first time period within which the first signal is transmitted by the network device, and a time difference value that is a function of at least a difference between the transmission time of the first time period and a reception time of the second time period within which the second signal is received by the network device. In some embodiments, the time difference value is a function of: (1) the difference between the transmission time of the first time period and the reception time of the second time period, and (2) a time offset that indicates a time difference between the first time period and the second time period. In some embodiments, the timing information in the third message includes: a transmission time of the first time period within which the first signal is transmitted by the network device, and a reception time of the second time period within which the second signal is received by the network device. In some embodiments, the timing information in the third message includes a first sum of: (1) a transmission time of the first time period within which the first signal is transmitted by the network device, and (2) a reception time of the second time period within which the second signal is received by the network device.

In some embodiments, the method further comprises transmitting, by the network device prior to the transmitting the first signal, a second message that: identifies any one or more of the first time period or the second time period, or indicates a transmission time of the first time period within which the first signal is transmitted by the network device. In some embodiments, the method further comprises receiving, by the network device, a first message that indicates to the network device to transmit the second message, wherein the network device transmits the second message in response to the receiving the first message. In some embodiments, the first message is included in a resource control (RRC) signaling, a medium access control (MAC) control element (CE), or an uplink control information (UCI). In some embodiments, the transmission time is associated with a starting boundary of the first time period or an ending boundary of the first time period, or the reception time is associated with a starting boundary of the second time period or an ending boundary of the second time period.

In some embodiments, the first time period or the second time period include a system frame, a sub-frame, a slot, a sub-slot, or an orthogonal frequency division multiplexing (OFDM) symbol. In some embodiments, the second message or the third message is included in a resource control (RRC) signaling, a medium access control (MAC) control element (CE), or downlink control information (DCI). In some embodiments, the first signal includes a downlink (DL) reference signal (RS) or a downlink channel. In some embodiments, the DL RS include a synchronization signal block (SSB) comprising a synchronization signal (SS) and a physical broadcast channel (PBCH) block, a channel state information reference signal (CSI-RS), a tracking reference signal (TRS), or a positioning reference signal (PRS). In some embodiments, the downlink channel includes a physical downlink control channel (PDCCH) or a physical downlink shared channel (PDSCH). In some embodiments, the second signal includes a physical random access channel (PRACH), a sounding reference signal (SRS), a physical uplink shared channel (PUSCH), or a physical uplink control channel (PUCCH).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 7 shows an exemplary flowchart for determining a time when a communication device receives a signal.

FIG. 8 shows an exemplary flowchart for indicating a timing information.

DETAILED DESCRIPTION

Figure 1:
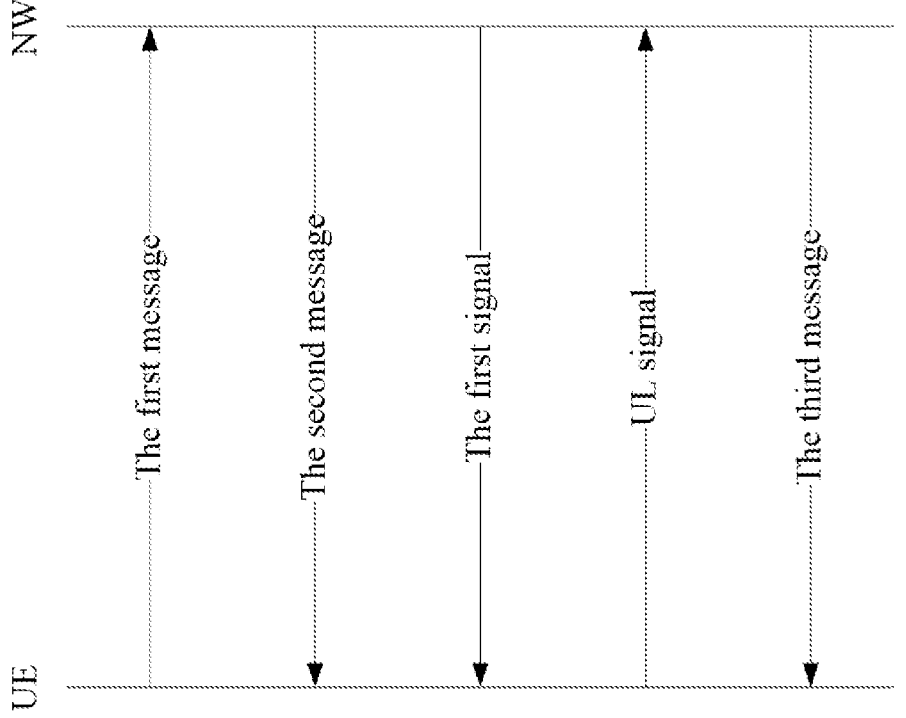
FIG. 1 illustrates an example flowchart of operations performed by a user equipment (UE) and a network (NW) for the UE to determine a time clock.

In the wireless communication, a strict clock synchronicity may be required for some services, for example, for services in factory automation or smart grid. In some scenarios, the maximum allowed time offset within a synchronization domain between two nodes may be smaller than 500 nanoseconds. To achieve this, the first node with time clock should deliver the time clock information to the second node only having an independent clock. However, the propagation delay may affect the accuracy of the obtained time clock when the second node obtains the time clock. In this patent document, some methods are provided for the node to determine an accurate time clock for time synchronization.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

It is understood that, in this disclosure, the disclosed techniques can be used for any node to obtain the time clock from the other node with clock time. For example, the UE obtains the time clock from the network, or the network obtains the time clock from the UE, or the UE obtains the time clock from another UE. In this disclosure, the UE obtaining the time clock from the network is used as an example, where the network is the node with clock time and the UE is node requiring the time clock.

Embodiment 1

In some embodiments, a UE sends a first message (e.g., signal, signaling) to a network (NW), such as a base station (BS). The message implies (or indicates) that the UE requests the network to send the time information. The network sends a second message to the UE, which can be in response to the network receiving the first message. The second message includes at least the time information which can indicate at least the transmitting time of a starting boundary or ending boundary of a first time unit (also known as first time period) within which a first signal is transmitted by the network, which can be the time when the network transmits the first time unit. For example, when the network transmits the starting boundary of the first time unit or the ending boundary of the first time unit. The first time unit can be a system frame, a sub-frame, a slot, a sub-slot or an OFDM symbol. The first time unit can be indicated by the network as well, for example, via the second message or another message. For example, the system frame number, the sub-frame number, the slot number, or the OFDM number of the first time unit can be indicated in the second message or in the another message. In some embodiments, the first time unit is indicated by the UE to the network.

Within the first time unit, the network transmits the first signal to the UE after the network transmits the second message. The first signal can include at least the downlink (DL) reference signal (RS) or the downlink channel. The DL RS can include at least a synchronization signal/physical broadcast channel block (SS/PBCH block, SSB), a channel state information reference signal (CSI-RS), a tracking reference signal (TRS), or a positioning reference signal (PRS), etc. The downlink channel can include a physical downlink control channel (PDCCH), or a physical downlink shared channel (PDSCH), etc.

Figure 2:
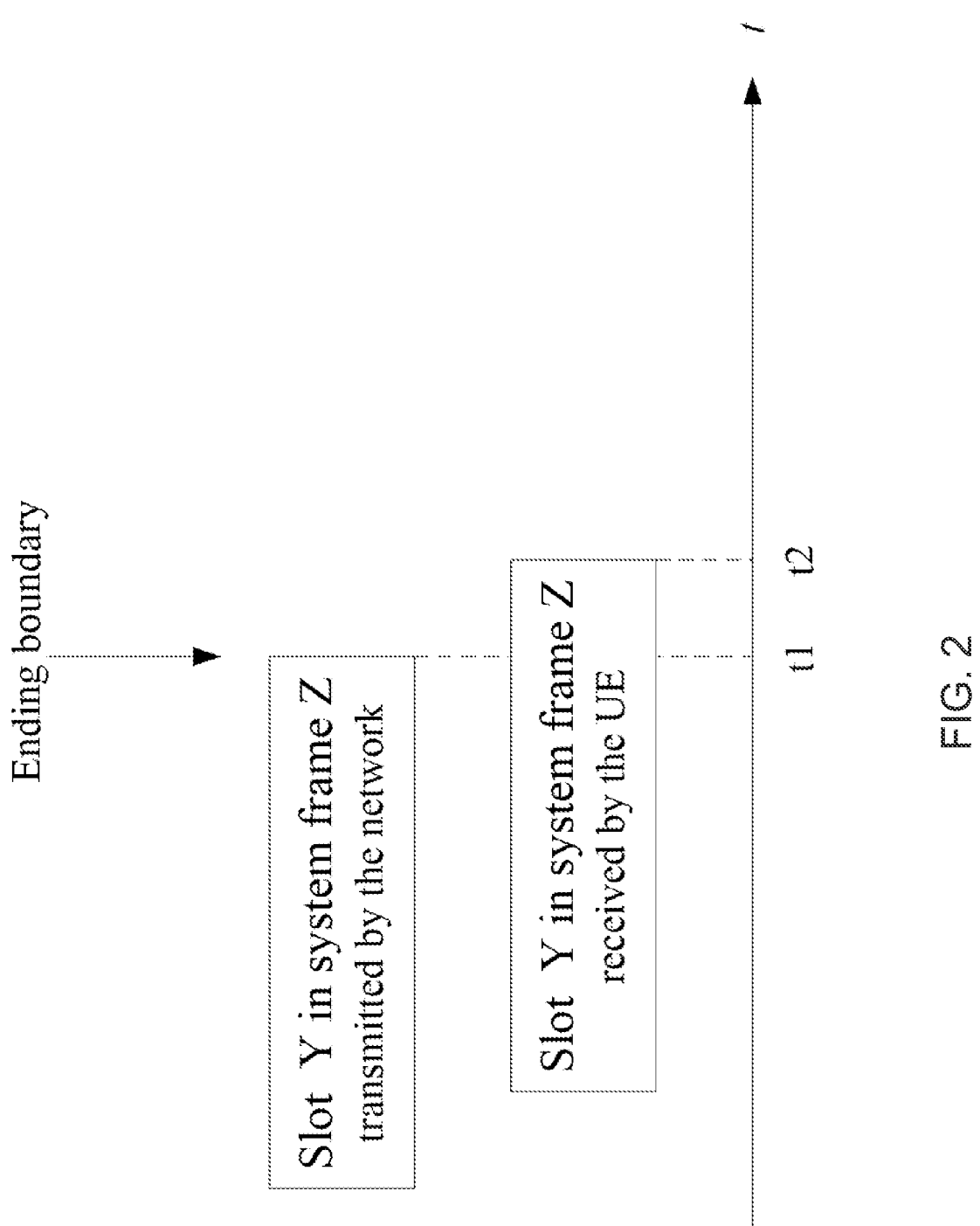
FIG. 2 shows an example timing diagram when a slot is transmitted by a NW and received by a UE.

The UE may receive the first signal within the first time unit and detects the downlink frame timing based on the first signal. The downlink frame timing may describe a time when the UE receives the first signal or the first time unit. The UE transmits uplink (UL) signal (which may also be known as a second signal) based on the detected downlink frame timing and the timing advance (TA) value if there is a valid TA. For example, as shown in FIG. 2, if the UE receives slot Y having an ending boundary at time t2 (which is also the starting boundary of slot Y+1), then the UE may transmit the UL signal at t2−TA value. The UL signal includes at least one of physical random access channel (PRACH), sounding reference signal (SRS), physical uplink shared channel (PUSCH), or physical uplink control channel (PUCCH), etc.

The network sends a third message to the UE. The third message includes at least a propagation delay value or the third message may include at least the TA command that includes either a relative TA value by which the UE may adjust (e.g., increases or decreases) the UE's TA value or an absolute TA value which the UE uses when the UE does not have a previous TA value before receiving the TA command. In some embodiments where the third message includes the TA command, after receiving the TA command, the UE obtains an updated TA value by increasing or decreasing UE's TA value with the relative TA value from the TA command or the UE obtains the updated TA value from the absolute TA value. The UE can obtain the time clock (also known as time clock value) when it receives the first signal by adding the transmitting time of a first time unit (as indicated by the time information from the network) with half of the updated TA value. In some embodiments where the third message includes the propagation delay, after receiving the propagation delay value, the UE can obtain the time clock when the UE receives the first signal by adding the transmitting time of a first time unit (as indicated by the time information from the network) with the indicated propagation delay value.

With this method, the UE can determine an accurate time clock from the network.

FIG. 1 illustrates an example flowchart of operations performed by a UE and a network (NW), such as a base station, for the UE to determine a time clock. The UE sends the first message to the network to request the network to provide the time information.

Then the network sends the time information which can be carried by the RRC signaling to the UE. In one example, as shown in the timing diagram in FIG. 2, the time information indicates the transmitting time of the ending boundary of the slot Y in the system frame Z. The slot Y in the system frame Z can also be indicated by the network via system frame number and the slot number.

The indicated slot Y is in the first system frame Z after the time information is sent. From the UE perspective, as shown in FIG. 2, the indicated slot is in the first system frame Z after it receives the time information from the network.

The transmitting time of the ending boundary of the indicated slot Y is t1 as shown in FIG. 2. The downlink RS, e.g., SSB, CSI-RS, TRS, or PRS, can be transmitted in the indicated slot Y. The UE performs downlink synchronization based on the downlink RS to determine the downlink frame timing. The UE detects the receiving time of the ending boundary of the indicated slot Y is at t2 as shown in FIG. 2. The UE transmits UL signal to the network based on the downlink frame timing detected by the indicated slot Y and the corresponding downlink RS.

The network sends the third message to the UE. In one example, the third message includes the propagation delay value. The UE determines that the time of t2 is the time indicated by the time information from the network (e.g., the transmitting time of the ending boundary of the slot Y) plus the indicated propagation delay value. For example, the time provided by the network (e.g., t2) is 8 o'clock 52 minute 33 second, 139 millisecond, 823 microsecond and 130 nanosecond on Mar. 18, 2021. The indicated propagation delay value is 59 nanoseconds. In this example, the UE can determine the time clock when the UE receives the ending boundary of indicated slot Y (e.g., t2) is 8 o'clock 52 minute 33 second, 139 millisecond, 823 microsecond and 189 nanosecond on Mar. 18, 2021.

In another example, the second message includes the TA command. The UE determines the updated TA value according to the information in the TA command as explained above. Then the UE can determine that the time of t2 is the time information provided by the network (e.g., the transmitting time of the ending boundary of the slot Y in FIG. 2) plus the half of the updated TA value. For example, if time provided by the network (e.g., t1) is 8 o'clock 52 minute 33 second, 139 millisecond, 823 microsecond and 130 nanosecond on Mar. 18, 2021, and if the updated TA value is 1792 nanoseconds, then the UE can determine the time clock when the UE receives the ending boundary of indicated slot Y (e.g., t2) is 8 o'clock 52 minute 33 second, 139 millisecond, 824 microsecond and 26 nanosecond on Mar. 18, 2021.

Embodiment 2

In some embodiments, a UE sends a first message (e.g., signal, signaling) to the network. The message implies (or indicates) that the UE requests the network to send the time information. The network sends a second message to the UE, which can be in response to the NW receiving the first message. The second message indicates or identifies at least the first time unit and the second time unit (also known as second time period), where the network transmits a first signal within the first time unit and where the network receives the UL signal within the second time unit. The network sends the time information to the UE in the second message or in the another message. In one example, the time information may indicate at least the transmitting time of the ending boundary (or the starting boundary) of the first time unit in time domain. The second time unit can be a system frame, a sub-frame, a slot, a sub-slot or an OFDM symbol. The second time unit can be indicated by the network as well, for example, via the second message or another message. For example, the system frame number, the subframe number, the slot number, or the OFDM number of the second time unit can be indicated in the second message or in the another message. In some embodiments, the first time unit and the second time unit are indicated by the UE to the network.

The first signal is transmitted in the first time unit from the network to the UE after the network transmits the second message. The UE transmits the UL signal to the network in the second time unit, where the UL signal is transmitted by the UE in response to receiving the first signal. The network sends a third message to the UE. The third message includes at least the Rx-Tx time difference. The Rx-Tx time difference is the time difference between the transmitting time of the ending boundary (or starting boundary) of the first time unit and the receiving time of the ending boundary (or starting boundary) of the second time unit observed by the network. In some embodiments, the time offset between the first time unit and the second time unit can be taken into account when determining the Rx-Tx time difference.

The UE determines the propagation delay value based on the Rx-Tx time difference. For example, as further explained below, the propagation delay can be determined using the following equation: $(T_{Rx-Tx,UE}-T_{Rx-Tx,NW})/2$. The UE can obtain the time clock when the UE receives the ending boundary of the first time unit by adding the indicated time (e.g., the transmitting time of the ending boundary (or the starting boundary) of the first time unit) to the determined propagation delay.

With this method, the UE can determine an accurate time clock from the network.

As shown in FIG. 1, the UE sends the first message to the network to request the network to provide the time information. The network sends the second message to the UE. In one example, the second message indicates slot 0 in the system frame 37 as the first time unit and slot 8 in system frame 37 as the second time unit. The network further indicates the transmitting time of the ending boundary of the slot 0 in the system 37. The transmitting time of an ending boundary of the first time slot is included in the second message or another message.

Figure 3:
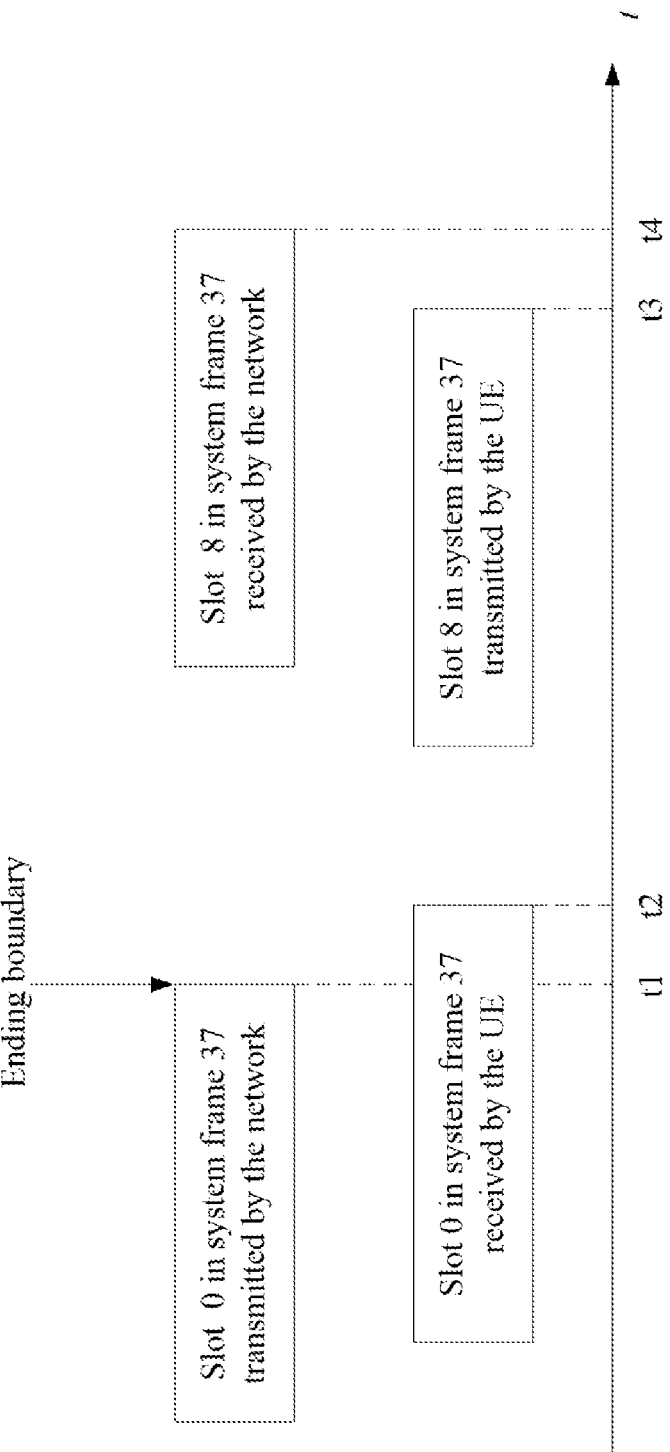
FIGS. 3 and 4 show example timing diagrams when a slot is transmitted by a NW and received by a UE and when another slot is transmitted by the UE and received by the NW.

The network sends the downlink signal within the slot 0 in the system frame 37. The UE transmits the UL signal within the slot 8 in the system frame 37. Then the network sends the third message including the Rx-Tx time difference observed by the network to the UE. The Rx-Tx time difference observed by the network (denoted by $T_{Rx-Tx,NW}$) is the time difference between the transmitting time of the ending boundary of the indicated slot 0 (e.g., t1 as shown in FIG. 3) and the receiving time of the ending boundary of the indicated slot 8 (e.g., t4 as shown in FIG. 3) from the network perspective. So, for example, the Rx-Tx time difference can be (t4−t1) or (t1−t4).

In some cases, the time offset between the slot 0 and slot 8 is taken into account. So, for example, the Rx-Tx time difference can be $(t4−t1−t_{offset})$ or $(t1−t4−t_{offset})$, where $t_{offset}$ is the time offset between the slot 0 and slot 8.

From the network perspective and in one example, the transmitting time of the ending boundary of slot 0 in the system frame 37 is 8 o'clock 52 minute 33 second, 139 millisecond, 823 microsecond and 130 nanosecond on Mar. 18, 2021 and the receiving time of the ending boundary of the slot 8 in the system frame 37 is 8 o'clock 52 minute 33 second, 139 millisecond, 831 microsecond and 170 nanosecond on Mar. 18, 2021. In this example, the Rx-Tx time difference observed by the network is 8 microseconds and 40 nanoseconds. Continuing with the example, if the time offset between the slot 0 and the slot 8 is taken into account, the Rx-Tx time difference is 40 nanoseconds, where the time offset is 8 microseconds corresponding to 8 slots.

When the UE received the Rx-Tx time difference, the UE determines the propagation delay value based on the received Rx-Tx time difference. The UE can determine (e.g., detect, measure) the Rx-Tx time difference observed by the UE (denoted by $T_{Rx-Tx,UE}$), which is the time difference between the receiving time of the slot 0 in the system frame 37 (e.g., t2 as shown in FIG. 3) and the transmitting time of the boundary of slot 8 in the system frame 37 (e.g., t3 as shown in FIG. 3) from the UE perspective. In an example, the Rx-Tx time difference observed by the UE ($T_{Rx-Tx,UE}$) is 128 nanoseconds if the time offset between the slot 0 and slot 8 is taken into account. Then, in this example, the UE can determine the propagation delay value is (($T_{Rx-Tx,UE}$–$T_{Rx-Tx,Nw}$)/2=44 nanoseconds with the assumption that the down propagation delay is equal to the uplink propagation delay. In one example, if the provided time information (e.g., t1) is 8 o'clock 52 minute 33 second, 139 millisecond, 823 microsecond and 130 nanoseconds on Mar. 18, 2021, and if the propagation delay value is 44 nanoseconds, then the UE can determine time when it receives the ending boundary of slot 0 is 8 o'clock 52 minute 33 second, 139 millisecond, 823 microsecond and 174 nanosecond on Mar. 18, 2021.

In some embodiments, the UE may sends the Rx-Tx time difference observed by the UE to the network. The Rx-Tx time difference is time difference between the receiving time of the ending boundary (or starting boundary) of the first time unit and the transmitting time of the ending boundary (or starting boundary) of the second time unit observed by the UE. The network can determine the propagation delay value by using the same method that the UE use, as explained above, after receiving the Rx-Tx time difference observed by the UE from the UE. Then the network sends the propagation delay value to the UE in order for the UE to determine the accurate time clock.

Embodiment 3

In some embodiments, a UE sends a message (e.g., signaling, signal) to the network. The message implies (or indicates) that the UE requests the network to send the time information. The network sends the second message (e.g., signaling, signal) to the UE, which can be in response to the NW receiving the first message. The second message indicates or identifies at least the first time unit and the second time unit, where the network transmits a first signal within the first time unit and where the network receives the UL signal within the second time unit. In Embodiment 3, the time information of the boundary of the first time slot may not be included in the second message. In some embodiments, the first time unit and the second time unit are indicated by the UE to the network.

Then the network transmits the DL signal in the first time unit. The DL signal includes at least SSB, CSI-RS, TRS, or PRS, etc. The UE transmits the UL signal in the second time unit. The UL signal includes at least PRACH, or SRS, etc.

In response to receiving the UL signal, the network sends the third message to the UE. The third message may at least includes the transmitting time of the first time unit (e.g., the starting boundary or the ending boundary of the first time unit) and the receiving time of the second time unit (e.g., the starting boundary or the ending boundary of the second time unit). The transmitting time and the receiving time are based on the local time clock of the network.

The UE determines the time clock offset between the network and the UE based on the information provided in the third message. The UE can further determine the time when it receives the DL signal.

With this method, the UE can determine an accurate time clock from the network.

Figure 4:
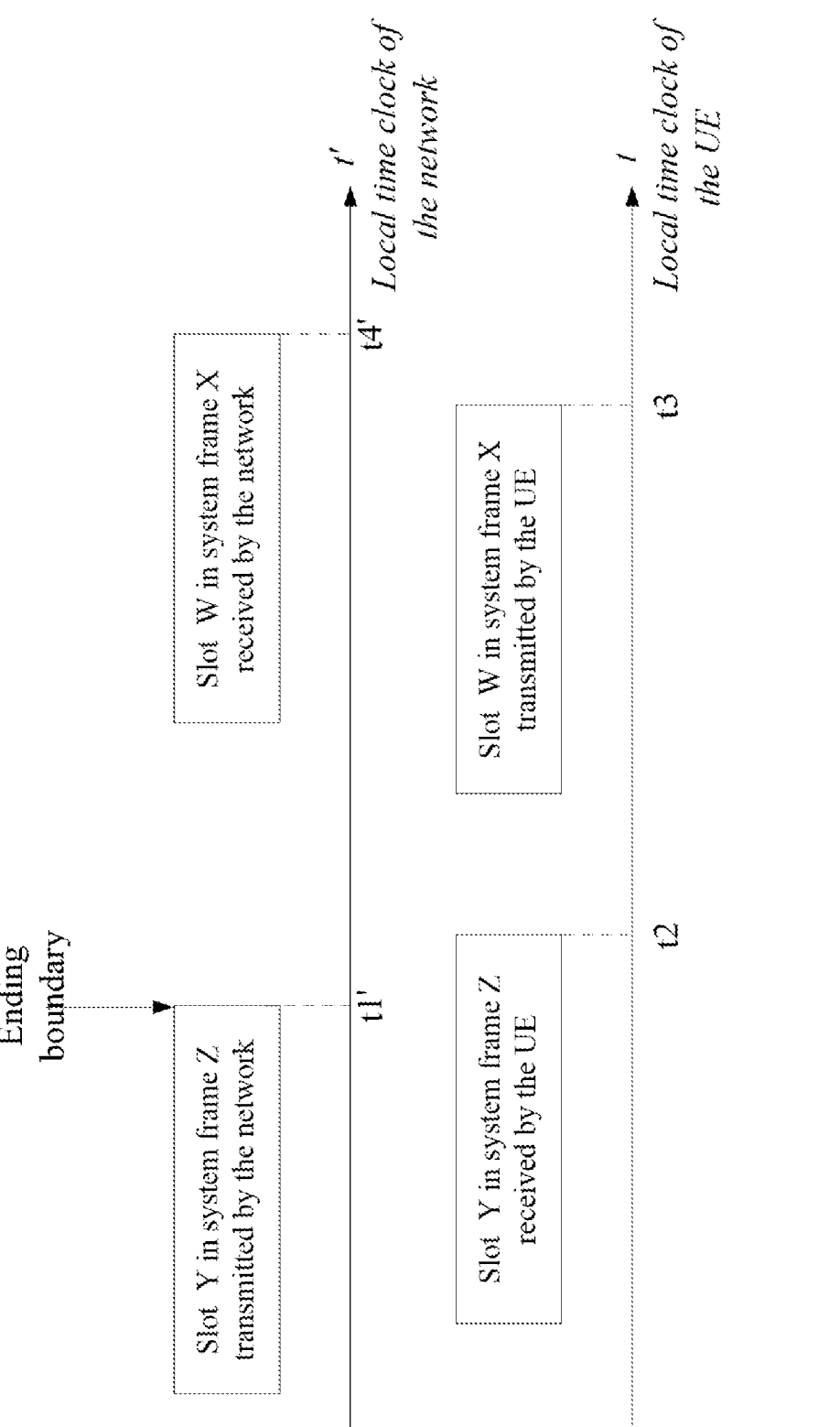

As shown in FIG. 1, the UE transmits a first message to the network to request the network to provide the time information. The network sends the second message to the UE, which can be in response to the NW receiving the first message. The second message can indicate the slot Y in the system frame Z as the first time unit and slot W in the system frame X as the second time unit. As shown in FIG. 4, in the slot Y, the network transmits the first signal to the UE after the network transmits the second message; and in the slot W, the UE transmits UL signal to the network.

The network sends the transmitting time of the ending boundary of the indicated slot Y and the receiving time of the ending boundary of the indicated slot W observed by the network. For example, the transmitting time of the ending boundary of the indicated slot Y (e.g., t1' as shown in FIG. 4) is 8 o'clock 52 minute 33 second, 139 millisecond, 823 microsecond and 130 nanosecond on Mar. 18, 2021. In this example, the receiving time of the ending boundary of indicated slot W is 8 o'clock 52 minute 33 second, 139 millisecond, 847 microsecond and 278 nanosecond on Mar. 18, 2021. Note these are based on the local clock time of the network.

From the UE perspective, it detects that the receiving time of the ending boundary of the indicated slot Y (e.g., t2 shown in FIG. 4) is, for example, 8 o'clock 52 minute 33 second, 191 millisecond, 528 microsecond and 377 nanosecond on Mar. 18, 2021. The transmitting time of the ending boundary of the indicated slot W (e.g., t3 as shown in FIG. 4) is, for example, 8 o'clock 52 minute 33 second, 191 millisecond, 552 microsecond and 313 nanosecond on Mar. 18, 2021. Note these are based on the clock time of the UE, which may not be the correct clock time.

In one example, the UE can determine the time clock offset between the network and the UE is ((t2+t3)–(t1'+t4'))/2, which is 51 milliseconds, 705 microseconds, 141 nanoseconds. The UE may subtract the time clock offset from the t2 value observed by the UE to obtain an updated t2 value. So, the UE can determine the updated time clock at t2 is 8 o'clock 52 minute 33 second, 139 millisecond, 823 microsecond and 236 nanosecond on Mar. 18, 2021.

In another example, the UE can determine the time clock offset between the network and the UE is ((t1'+t4')–(t2+t3))/2, which is –51 milliseconds, –705 microseconds, –141 nanoseconds. The UE may add the time clock offset to the t2 value observed by the UE to obtain an updated t2 value. So, the UE can determine the updated time clock at t2 is 8 o'clock 52 minute 33 second, 139 millisecond, 823 microsecond and 236 nanosecond on Mar. 18, 2021.

In some embodiments, the third message includes the sum of the transmitting time of the indicated first time unit and the receiving time of the second time unit observed by the network. Here the transmitting time and the receiving time are based on the local time clock of the network.

The UE determines the time offset between the network and the UE. The UE can further determine the time when it receives the DL signal.

Still referring to FIG. 4, the network indicates sum of the transmitting time of the ending boundary of the indicated slot Y and the receiving time of the ending boundary of the slot W observed by the network, e.g., the sum of 8 o'clock 52 minute 33 second, 139 millisecond, 823 microsecond and 130 nanosecond on Mar. 18, 2021 and 8 o'clock 52 minute 33 second, 139 millisecond, 847 microsecond and 278 nanosecond on Mar. 18, 2021 based on the local time clock of the network. This is denoted by S1, which is equal to t1'+t4' in FIG. 4.

The UE can obtain the sum of the receiving time of the ending boundary of the indicated slot Y and the transmitting time of the ending boundary of the indicated slot W observed by the UE, e.g., the sum of the 8 o'clock 52 minute 33 second, 191 millisecond, 528 microsecond and 377 nanosecond on Mar. 18, 2021 and 8 o'clock 52 minute 33 second, 191 millisecond, 552 microsecond and 313 nanosecond on Mar. 18, 2021 based on the local time clock of the UE. This is denoted by S2, which is equal to t2+t3 in FIG. 4.

In one example, the UE can determine the time clock between the network and the UE is $(S2-S1)12=51, 705, 141$ nanoseconds. The UE may subtract the time clock between the network and the UE from the t2 value observed by the UE to obtain an updated t2 value. So, the UE can determine the updated time clock at t2 is 8 o'clock 52 minute 33 second, 139 millisecond, 823 microsecond and 236 nanoseconds on Mar. 18, 2021.

In another example, the UE can determine the time clock between the network and the UE is $(S1-S2)/2=-51, 705, 141$ nanoseconds. The UE may add the time clock between the network and the UE to the t2 value observed by the UE to obtain an updated t2 value. So, the UE can determine the updated time clock at t2 is 8 o'clock 52 minute 33 second, 139 millisecond, 823 microsecond and 236 nanoseconds on Mar. 18, 2021.

In some embodiments, the UE may send the receiving time of the ending boundary (or the starting boundary) of the first time unit and the transmitting time of the ending boundary (or the starting boundary) of the second time unit, or the sum of them observed by the UE to the network. The network can determine the time clock offset between network and the UE by using the method that the UE use as explained above. Then the network sends the time clock offset to the UE. The UE determine the time when it receives the DL signals as explained above.

In this patent document, if a message (e.g., second message or third message) is sent from the network to the UE or if a message (e.g., first message) is sent from the UE to the network, then the message can be included in resource control (RRC) signaling, medium access control (MAC) control element (CE). If a message is sent from the network to the UE, the message can be included in a downlink control information (DCI). In this patent document, if a message (e.g., first signal) is sent from the UE to the network, then the message can be included in an uplink control information (UCI). In this patent document, if a message is sent from the UE to another UE, then the message may be included in sidelink control information (SCI).

Embodiment 4

When the network indicates the first time unit to the UE, the configurations of the DL RS transmitted in the first time unit are also indicated to the UE via the second message. For example, the SSB index, the CSI-RS resource index, TRS resource index, or the PRS index can be indicated to the UE in the second message. Alternatively, when the network or the UE indicates the first time unit, it can mean that one or more DL RS are triggered to be transmitted in the first time unit. For example, SSB, aperiodic CSI-RS, aperiodic TRS, aperiodic PRS are triggered. The configuration of the DL RS is configured before the DL RS is triggered.

When the network indicates the second time unit to the UE, the configurations of the UL RS transmitted in the second time unit are also indicated to the UE. For example, the PRACH resource configuration, or SRS configuration can be indicated to the UE. Alternatively, when the network or the UE indicates the second time unit, it can mean that one or more UL RS are triggered to be transmitted in the first time unit. For example, PRACH, aperiodic SRS are triggered. The configurations of the UL RS transmitted in the second time unit is configured before the UL RS is triggered.

In some embodiments, the network indicates a plurality of the first time units and/or the second time units to the UE. The network indicates the transmitting time, the receiving time and/or other information (propagation delay value, the TA command, the Rx-Tx time difference, or the sum of them) for each first time unit or each second time unit according to the embodiments. When the UE receives each first time unit, it determines the corresponding time according to the embodiments. It can obtain a plurality of time for the plurality of the first time unit, respectively. Then it can obtain the time by averaging the plurality of the obtained time. When it performs averaging, the time offset between the first time units is taken into account.

It is understood that, in this disclosure, some of the steps in the procedure may not be necessary. For example, the first step that the UE sends the first message to the network may not be needed in some embodiments. In such embodiments, the network sends the time information to the UE without receiving a request (e.g., without receiving the first message) from the UE.

Figure 5:
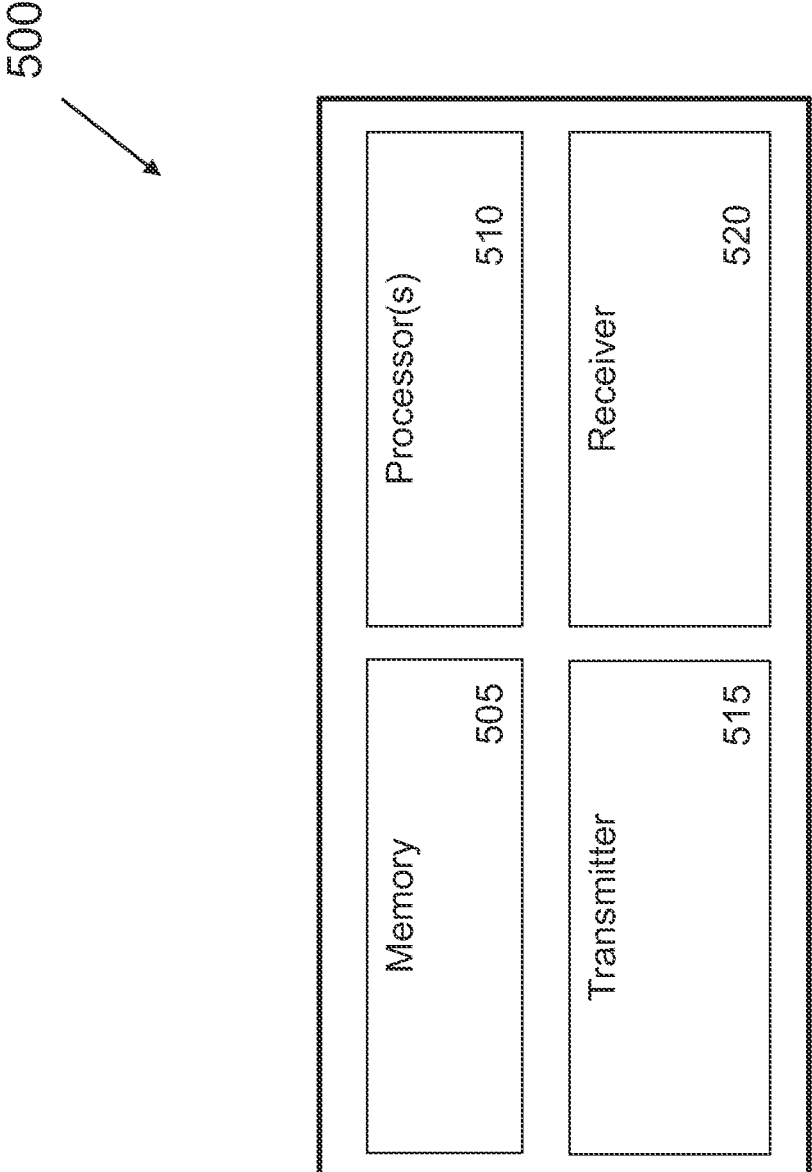
FIG. 5 shows an exemplary block diagram of a hardware platform that may be a part of a network device or a user equipment.

FIG. 5 shows an exemplary block diagram of a hardware platform 500 that may be a part of a network device (e.g., base station) or communication device (e.g., a user equipment). The hardware platform 500 includes at least one processor 510 and a memory 505 having instructions stored thereupon. The instructions upon execution by the processor 510 configure the hardware platform 500 to perform the operations described in FIGS. 1 to 4 and 7 to 8 and in the various embodiments described in this patent document. The transmitter 515 transmits or sends information or data to another device. For example, a network device transmitter can send a message to a user equipment. The receiver 520 receives information or data transmitted or sent by another device. For example, a user equipment can receive a message from a network device.

Figure 6:
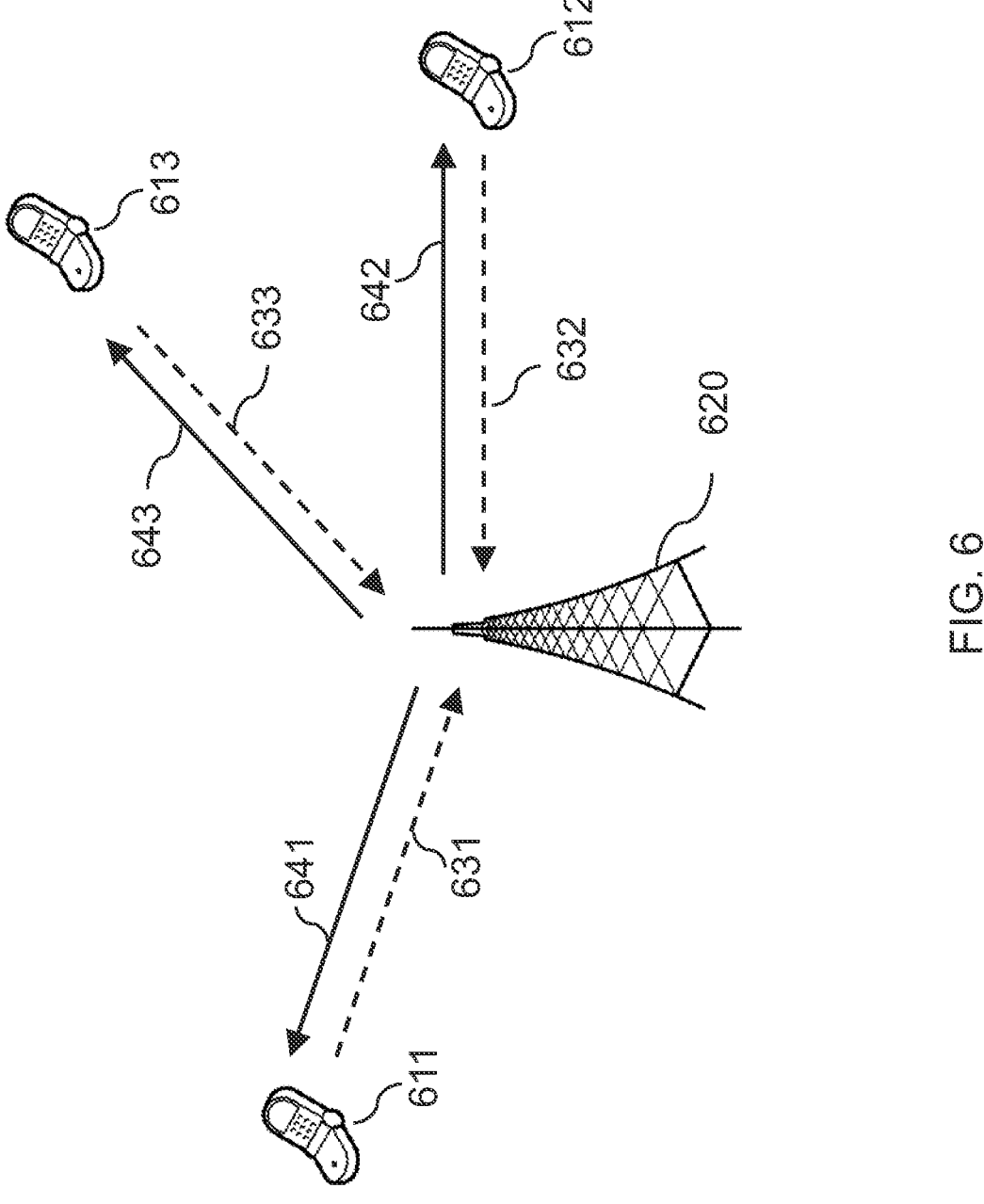
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

FIG. 7 shows an exemplary flowchart for determining a time when a communication device receives a signal. Operation 702 includes receiving, by a communication device, a first signal in a first time period. Operation 704 includes transmitting, by the communication device, a second signal in a second time period later than the first time period to a network device. Operation 706 includes receiving, by the communication device, a third message comprising a timing information associated with the first time period, the second time period, or a propagation delay value. Operation 708 includes determining, by the communication device, a time when the communication device receives the first signal based at least on the timing information.

In some embodiments, the timing information in the third message includes a transmission time of the first time period within which the first signal is transmitted by the network device, the third message includes a timing advance (TA) value, the communication device determines an updated TA value by using the TA value and a previous TA value or by using the TA value, and the communication device determines the time when the communication device receives the first signal by adding the transmission time of the first time period to one half of the updated TA value. In some embodiments, the timing information in the third message includes a transmission time of the first time period within which the first signal is transmitted by the network device, and the communication device determines the time when the communication device receives the first signal by adding the transmission time of the first time period to the propagation delay value. In some embodiments, the timing information in the third message includes: a transmission time of the first time period within which the first signal is transmitted by the network device, and a first time difference value that is a function of at least a difference between the transmission time of the first time period and a reception time of the second time period within which the second signal is received by the network device, the communication device determines the time when the communication device receives the first signal by adding the transmission time of the first time period to the propagation delay value, and the propagation delay value is determined by the first time difference value and a second time difference value that is a function of at least a difference between a reception time of the first time period and a transmission time of the second time period.

In some embodiments, the first time difference value is a function of: (1) the difference between the transmission time of the first time period and the reception time of the second time period, and (2) a time offset that indicates a time difference between the first time period and the second time period, and the second time difference value is a function of: (1) the difference between the reception time of the first time period and the transmission time of the second time period, and (2) the time offset that indicates the time difference between the first time period and the second time period. In some embodiments, the timing information in the third message includes: a transmission time of the first time period within which the first signal is transmitted by the network device, and a reception time of the second time period within which the second signal is received by the network device, and the communication device determines the time when the communication device receives the first signal by subtracting or adding a time clock offset value from or to a first time associated with a first boundary of the first time period in which the first signal is received by the communication device, and the time clock offset value is a function of: the transmission time of the first time period, the reception time of the second time period, the first time associated with the first boundary of the first time period, and a second time associated with a second boundary of the second time period in which the second signal is transmitted by the communication device.

In some embodiments, the timing information in the third message includes a first sum of: (1) a transmission time of the first time period within which the first signal is transmitted by the network device, and (2) a reception time of the second time period within which the second signal is received by the network device, and the communication device determines the time when the communication device receives the first signal by subtracting or adding a value determined by the communication device from or to a first time associated with a first boundary of the first time period in which the first signal is received by the communication device, the value is a function of a first variable and a second variable, the first variable is the first sum, and the second variable is a second sum of: (1) the first time associated with the first boundary of the first time period and (2) a second time associated with a second boundary of the second time period in which the second signal is transmitted by the communication device.

In some embodiments, the method further comprises receiving, by the communication device prior to the receiving the first signal, a second message that: identifies any one or more of the first time period or the second time period, or indicates a transmission time of the first time period within which the first signal is transmitted by the network device. In some embodiment, the method further comprises transmitting, by the communication device, a first message that indicates to the network device to transmit the second message, wherein the communication device receives the second message in response to the transmitting the first message. In some embodiments, the first message is included in a resource control (RRC) signaling, a medium access control (MAC) control element (CE), or an uplink control information (UCI). In some embodiments, the transmission time is associated with a starting boundary of the first time period or an ending boundary of the first time period, or the reception time is associated with a starting boundary of the second time period or an ending boundary of the second time period. In some embodiments, the first time period or the second time period include a system frame, a sub-frame, a slot, a sub-slot, or an orthogonal frequency division multiplexing (OFDM) symbol. In some embodiments, the second message or the third message is included in a resource control (RRC) signaling, a medium access control (MAC) control element (CE), or downlink control information (DCI).

In some embodiments, the first signal includes a downlink (DL) reference signal (RS) or a downlink channel. In some embodiments, the DL RS include a synchronization signal block (SSB) comprising a synchronization signal (SS) and a physical broadcast channel (PBCH) block, a channel state information reference signal (CSI-RS), a tracking reference signal (TRS), or a positioning reference signal (PRS). In some embodiments, the downlink channel includes a physical downlink control channel (PDCCH) or a physical downlink shared channel (PDSCH). In some embodiments, the second signal includes a physical random access channel (PRACH), a sounding reference signal (SRS), a physical uplink shared channel (PUSCH), or a physical uplink control channel (PUCCH).

FIG. 8 shows an exemplary flowchart for indicating a timing information. Operation 802 includes transmitting, by a network device, a first signal in a first time period.

Operation 804 includes receiving, by the network device, a second signal in a second time period later than the first time period from a communication device. Operation 806 includes transmitting, by the network device, a third message comprising a timing information associated with the first time period, the second time period, or a propagation delay value, wherein a time when the communication device receives the first signal is determined based at least on the timing information.

In some embodiments, the timing information in the third message includes a transmission time of the first time period within which the first signal is transmitted by the network device, and the third message includes a timing advance (TA) value. In some embodiments, the timing information in the third message includes a transmission time of the first time period within which the first signal is transmitted by the network device. In some embodiments, the timing information in the third message includes: a transmission time of the first time period within which the first signal is transmitted by the network device, and a time difference value that is a function of at least a difference between the transmission time of the first time period and a reception time of the second time period within which the second signal is received by the network device. In some embodiments, the time difference value is a function of: (1) the difference between the transmission time of the first time period and the reception time of the second time period, and (2) a time offset that indicates a time difference between the first time period and the second time period. In some embodiments, the timing information in the third message includes: a transmission time of the first time period within which the first signal is transmitted by the network device, and a reception time of the second time period within which the second signal is received by the network device. In some embodiments, the timing information in the third message includes a first sum of: (1) a transmission time of the first time period within which the first signal is transmitted by the network device, and (2) a reception time of the second time period within which the second signal is received by the network device.

In some embodiments, the method further comprises transmitting, by the network device prior to the transmitting the first signal, a second message that: identifies any one or more of the first time period or the second time period, or indicates a transmission time of the first time period within which the first signal is transmitted by the network device. In some embodiments, the method further comprises receiving, by the network device, a first message that indicates to the network device to transmit the second message, wherein the network device transmits the second message in response to the receiving the first message. In some embodiments, the first message is included in a resource control (RRC) signaling, a medium access control (MAC) control element (CE), or an uplink control information (UCI). In some embodiments, the transmission time is associated with a starting boundary of the first time period or an ending boundary of the first time period, or the reception time is associated with a starting boundary of the second time period or an ending boundary of the second time period.

In some embodiments, the first time period or the second time period include a system frame, a sub-frame, a slot, a sub-slot, or an orthogonal frequency division multiplexing (OFDM) symbol. In some embodiments, the second message or the third message is included in a resource control (RRC) signaling, a medium access control (MAC) control element (CE), or downlink control information (DCI). In some embodiments, the first signal includes a downlink (DL) reference signal (RS) or a downlink channel. In some embodiments, the DL RS include a synchronization signal block (SSB) comprising a synchronization signal (SS) and a physical broadcast channel (PBCH) block, a channel state information reference signal (CSI-RS), a tracking reference signal (TRS), or a positioning reference signal (PRS). In some embodiments, the downlink channel includes a physical downlink control channel (PDCCH) or a physical downlink shared channel (PDSCH). In some embodiments, the second signal includes a physical random access channel (PRACH), a sounding reference signal (SRS), a physical uplink shared channel (PUSCH), or a physical uplink control channel (PUCCH).

The section below describes an example set of operations for time synchronization:

The UE may send a request to the network

The network sends a first time unit and/or the second time unit to the UE

The DL signal is transmitted by the network in the first time unit and the UL signal is transmitted by the UE in the second time unit based on the downlink timing detected by the DL signal The network sends a message (e.g., a second message and/or third message) to the UE including:

The transmitting time of the first time unit

The receiving time of the second time unit

The time difference value indicating a difference between of transmitting time of the first time unit and the receiving time of the second time unit The sum of the transmitting time of the first time unit and the receiving time of the second time unit, and/or The propagation delay value The UE determines a time when the UE received the DL signal based on the information in the message In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
receiving, by a communication device, a first signal in a first subframe, wherein the first signal is a tracking reference signal (TRS);
transmitting, by the communication device, a second signal in a second subframe to a network device based on a valid timing advance value;
receiving, by the communication device, a message comprising a timing information associated with the first subframe and the second subframe; and
determining, by the communication device, a propagation delay based at least on the timing information,
wherein the timing information in the message includes a first time difference value that is a difference between a transmission time of the first subframe and a reception time of the second subframe within which the second signal is received by the network device,
wherein a value of the propagation delay is determined by the first time difference value and a second time difference value that is a difference between a reception time of the first subframe and a transmission time of the second subframe.

2. The method of claim 1, wherein the message is included in a resource control (RRC) signaling.

3. The method of claim 1, wherein the second signal includes a sounding reference signal (SRS).

4. A wireless communication method, comprising:
transmitting, by a network device, a first signal in a first subframe, wherein the first signal is a tracking reference signal (TRS);
receiving, by the network device, a second signal in a second subframe from a communication device that was transmitted based on a valid timing advance value; and
transmitting, by the network device, a message comprising a timing information associated with the first subframe and the second subframe,
wherein a propagation delay is based at least on the timing information, and
wherein the timing information in the message includes a time difference value that is a difference between a transmission time of the first subframe and a reception time of the second subframe within which the second signal is received by the network device.

5. The method of claim 4, wherein the message is included in a resource control (RRC) signaling.

6. The method of claim 4, wherein the second signal includes a sounding reference signal (SRS).

7. An apparatus for wireless communication comprising at least one processor and a memory having instructions stored thereupon, wherein the processor, upon execution of the instructions, configures the apparatus to:
receive, by a communication device, a first signal in a first subframe, wherein the first signal is a tracking reference signal (TRS);
transmit, by the communication device, a second signal in a second subframe to a network device based on a valid timing advance value;
receive, by the communication device, a message comprising a timing information associated with the first subframe and the second subframe; and
determine, by the communication device, a propagation delay based at least on the timing information,
wherein the timing information in the message includes a first time difference value that is a difference between a transmission time of the first subframe and a reception time of the second subframe within which the second signal is received by the network device,
wherein a value of the propagation delay is determined by the first time difference value and a second time difference value that is a difference between a reception time of the first subframe and a transmission time of the second subframe.

8. The apparatus of claim 7, wherein the message is included in a resource control (RRC) signaling.

9. The apparatus of claim 7, wherein the second signal includes a sounding reference signal (SRS).

10. An apparatus for wireless communication comprising at least one processor and a memory having instructions stored thereupon, wherein the processor, upon execution of the instructions, configures the apparatus to:
transmit, by a network device, a first signal in a first subframe, wherein the first signal is a tracking reference signal (TRS);
receive, by the network device, a second signal in a second subframe from a communication device that is transmitted based on a valid timing advance value; and
transmit, by the network device, a message comprising a timing information associated with the first subframe and the second subframe,
wherein a propagation delay is based at least on the timing information, and wherein the timing information in the message includes a time difference value that is a difference between a transmission time of the first subframe and a reception time of the second subframe within which the second signal is received by the network device.

11. The apparatus of claim 10, wherein the message is included in a resource control (RRC) signaling.

12. The apparatus of claim 10, wherein the second signal includes a sounding reference signal (SRS).

* * * * *